United States Patent
Moroney et al.

(10) Patent No.: US 9,497,514 B2
(45) Date of Patent: Nov. 15, 2016

(54) DTCP CONVERTER FOR HLS

(71) Applicant: General Instrument Corporation, Horsham, PA (US)

(72) Inventors: Paul Moroney, La Jolla, CA (US); Geetha Mangalore, San Diego, CA (US); William P. Franks, San Diego, CA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 110 days.

(21) Appl. No.: 14/312,536

(22) Filed: Jun. 23, 2014

(65) Prior Publication Data

US 2014/0376719 A1 Dec. 25, 2014

Related U.S. Application Data (60) Provisional application No. 61/838,180, filed on Jun. 21, 2013, provisional application No. 61/846,593, filed on Jul. 15, 2013, provisional application No. 61/856,536, filed on Jul. 19, 2013, provisional application No. 61/857,605, filed on Jul. 23, 2013, provisional application No. 61/874,478, filed on Sep. 6, 2013, provisional application No. 61/890,075, filed on Oct. 11, 2013, provisional application No. 62/004,953, filed on May 30, 2014.

(51) Int. Cl.
*H04N 21/647* (2011.01)
*H04N 7/167* (2011.01)
(Continued)

(52) U.S. Cl.
CPC ...... *H04N 21/64715* (2013.01); *H04L 9/0861* (2013.01); *H04L 63/00* (2013.01); *H04L 63/061* (2013.01); *H04L 63/123* (2013.01); *H04L 65/1026* (2013.01); *H04L 65/608* (2013.01); *H04L 65/80* (2013.01); *H04N 7/1675* (2013.01); *H04N 7/17318* (2013.01); *H04N 21/2351* (2013.01); *H04N 21/2381* (2013.01); *H04N 21/23439* (2013.01); *H04N 21/26613* (2013.01); *H04N 21/4126* (2013.01); *H04N 21/4181* (2013.01); *H04N 21/433* (2013.01); *H04N 21/435* (2013.01); *H04N 21/4363* (2013.01); *H04N 21/4408* (2013.01); *H04N 21/440218* (2013.01); *H04N 21/47217* (2013.01); *H04N 21/6131* (2013.01); *H04N 21/64322* (2013.01);
(Continued)

(58) Field of Classification Search
None
See application file for complete search history.

(56) References Cited

U.S. PATENT DOCUMENTS 9,060,031 B1 * 6/2015 Taylor ............... H04L 67/2814
2007/0180270 A1 * 8/2007 Kumagai ............. G06F 21/72
713/193

(Continued)

OTHER PUBLICATIONS

Invitation to Pay Additional Fees, PCT Form ISA/206, dated Sep. 15, 2014.

(Continued)

*Primary Examiner* — Jung Kim
*Assistant Examiner* — Ngoc D Nguyen
(74) *Attorney, Agent, or Firm* — Thomas A. Ward (57) ABSTRACT

A method for DTCP to HLS conversion is provided that starts with a standard DTCP Protected Content Packet (PCP) structure. The PCP payload data is chunked at defined chunk boundaries. Each chunk is then appended with a pad to be compatible with HLS. An HLS playlist is then provided using the PCP header with identification of the chunks and a keytag. The chunk is encrypted with a DTCP key calculated by the DTCP standard using: (a) copy control bits; (b) a nonce, and (c) an exchange key ID. Relevant PCP header fields are provided in the keytag for the HLS playlist, including the value of the copy control bits, the nonce and the exchange key ID, supporting the transaction that enables calculation of the DTCP content key to enable later decryption of the chunks.

20 Claims, 5 Drawing Sheets

(51) Int. Cl.
| | |
|---|---|
| H04N 7/173 | (2011.01) |
| H04N 21/235 | (2011.01) |
| H04N 21/2381 | (2011.01) |
| H04N 21/266 | (2011.01) |
| H04N 21/418 | (2011.01) |
| H04N 21/433 | (2011.01) |
| H04N 21/435 | (2011.01) |
| H04N 21/472 | (2011.01) |
| H04N 21/6587 | (2011.01) |
| H04L 9/08 | (2006.01) |
| H04L 29/06 | (2006.01) |
| H04N 21/41 | (2011.01) |
| H04N 21/4402 | (2011.01) |
| H04N 21/4408 | (2011.01) |
| H04N 21/61 | (2011.01) |
| H04N 21/2343 | (2011.01) |
| H04N 21/4363 | (2011.01) |
| H04N 21/643 | (2011.01) |
| H04N 21/8355 | (2011.01) |
| H04N 21/845 | (2011.01) |
| H04N 21/262 | (2011.01) |
| H04N 21/482 | (2011.01) |

(52) U.S. Cl.
CPC ...... *H04N 21/6587* (2013.01); *H04N 21/8355* (2013.01); *H04N 21/8456* (2013.01); *H04L 2209/20* (2013.01); *H04L 2209/60* (2013.01); *H04N 21/26258* (2013.01); *H04N 21/4825* (2013.01)

(56) References Cited

U.S. PATENT DOCUMENTS

2013/0145406 A1* 6/2013 Baskaran ............ H04N 21/2396
725/87
2013/0283393 A1* 10/2013 Hierro .................... G06F 21/10
726/27
2015/0082337 A1* 3/2015 Mamidwar ...... H04N 21/23895
725/31

OTHER PUBLICATIONS

"Home Networking Security Specification OC-SP-HN-SEC-I05-130418", OpenCable Specifications Home Networking, Apr. 18, 2013, 24 pgs.

R. Pantos, et al., "HTTP Live Streaming; draft-pantos-http-live-streaming-11.txt", Internet Engineering Task Force (IETF), Apr. 17, 2013, 37 pgs.

DTCP: "DTCP vol. 1 Supplement E Mapping DTCP to IP (Informational Version)", DTCP vol. 1 Supplement E Revision 1.4 ED3 (Informational Version), Jun. 5, 2013, 50 pgs.

* cited by examiner

DTCP CONVERTER FOR HLS

CLAIM OF PRIORITY

This Application claims priority under 35 U.S.C. §119(e) from the following earlier filed United States Provisional Applications: (1) Ser. No. 61/838,180, filed Jun. 21, 2013; (2) Ser. No. 61/846,593, filed Jul. 15, 2013; (3) Ser. No. 61/856,563, filed Jul. 19, 2013; (4) Ser. No. 61/857,605, filed Jul. 23, 2013; (5) Ser. No. 61/874,478, filed Sep. 6, 2013; (6) Ser. No. 61/890,075, filed Oct. 11, 2013; and (7) Ser. No. 62/004,953, filed May 30, 2014, all of which are hereby incorporated by reference.

TECHNICAL FIELD

The present invention relates to the field of digital video streaming. More particularly, the invention relates to securely streaming media content using both the HTTP Live Stream (HLS) standard and the Digital Transmission Content Protection (DTCP) over Internet Protocol standard.

BACKGROUND

Cable system operators or other networks operators feed streaming media to a gateway device for distribution in a consumer's home. The gateway device can offer a singular means to access all forms of content-live, on-demand, online, over-the-top, or Digital Video Recorders (DVRs) within homes today. The gateway enables connection to the home network devices, for example by connecting to a WiFi router or a Multimedia over Coax Alliance (MoCA) connection that provides IP over in-home coaxial cabling.

Consumers desire to use devices that comply with a common standards compliant approach to access streaming video from a home gateway, so that all their home devices will be able to receive streaming video content provided from the same home gateway. DTCP is a standard defined for a significant number of consumer devices. Apple's HLS is another standard often mandated by Apple to access content using its devices. DTCP and HLS are not compatible, but are close in some ways. It is desirable to use HLS player devices on DTCP compliant systems.

When an IP device in the home is a mobile client, like an iPad, it can travel and appear outside the home. The user outside the home may still desire to stream content from his home gateway's storage. To stream content from that gateway, cable box or DVR that are DTCP compatible using a WiFi router to a remote location, DTCP imposes certain requirements. Apple imposes other requirements based upon its HLS standard that are mandatory when remote connection occurs over a 3G or 4G network. Content provided from gateways, cable boxes and DVRs further encrypt their content or have other digital rights management schemes in place to prevent unauthorized copying or transfer of media content.

It is desirable for the DTCP standard to be implemented so that it is compatible with the HLS standard used by Apple® devices that run the iOS® operating system, such as the iPhone® and iPad®, allowing an HLS player to operate with a DTCP compatible system.

SUMMARY

Embodiments of the present invention provide a DTCP translator that starts with DTCP standard compliant video and converts the video for compatibility with the HLS standard.

In one embodiment, a method for DTCP to HLS conversion is provided that starts with a standard DTCP Protected Content Packet (PCP) structure. The PCP payload data is chunked at defined chunk boundaries. Each chunk is then appended with a pad encrypted with the same key and appropriate IV to be compatible with HLS. An HLS playlist is then provided using the PCP header with identification of the chunks and a keytag. The chunk is encrypted with a DTCP key calculated by the DTCP standard using: (a) copy control bits; (b) a nonce, and (c) an exchange key ID. Relevant PCP header fields are provided in the keytag for the HLS playlist, including the value of the copy control bits, the nonce and the exchange key ID, supporting the transaction that determines the exchange key and the subsequent calculation of the content key to enable encryption and decryption of the chunks.

BRIEF DESCRIPTION OF THE DRAWINGS

Further details of the present invention are explained with the help of the attached drawings in which.

DETAILED DESCRIPTION

System Overview

Figure 1:
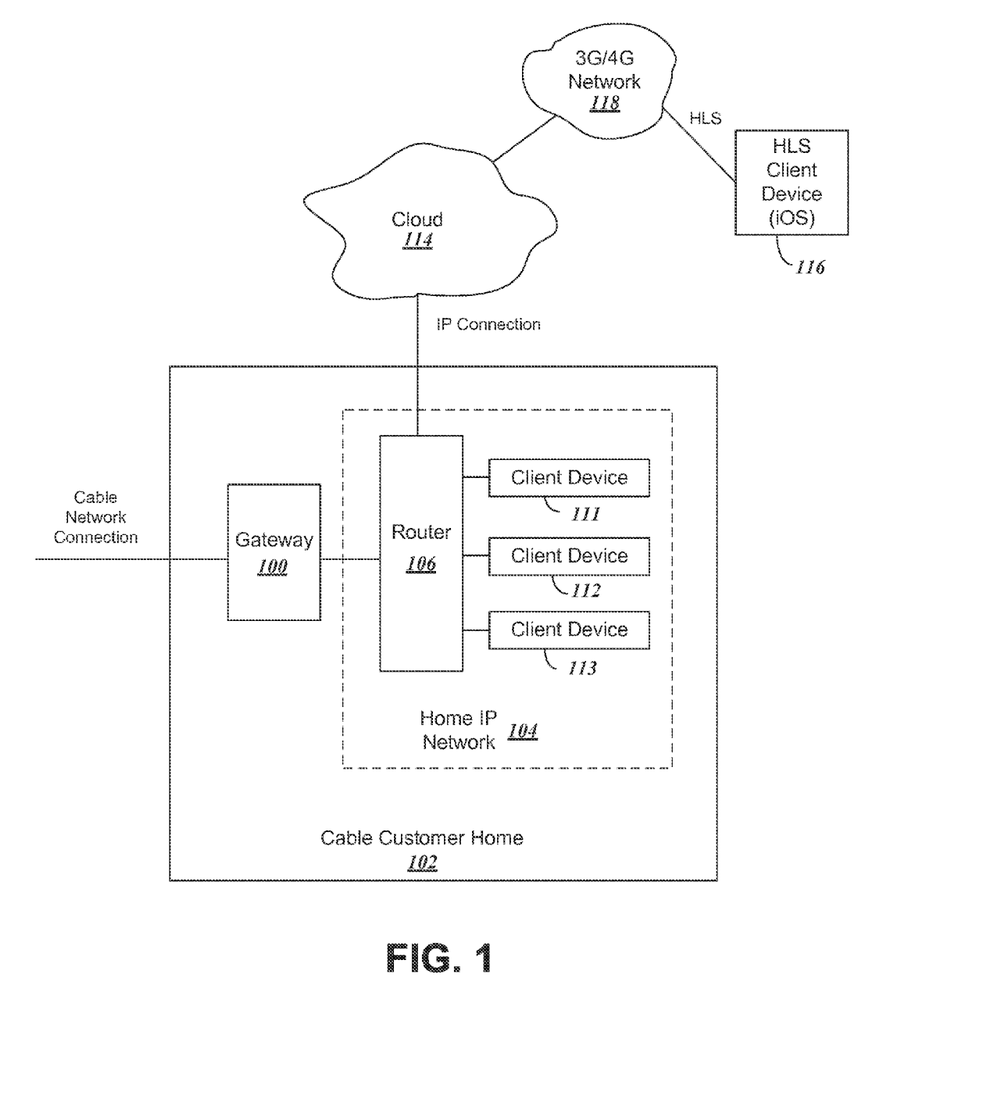
FIG. 1 provides a system overview, illustrating a connection of components that can stream video to an HLS device from a DTCP compliant system when using embodiments of the present invention.

FIG. 1 provides a system overview, illustrating a connection of components that can stream video to an HLS device from a DTCP compliant system when using embodiments of the present invention. In FIG. 1, a cable network connection is shown provided to a gateway 100 of a cable customer's home 102. The cable network connection provided to the gateway 100 can be to a cable system operator or other streaming content provider such as a satellite system. The gateway 100 then provides content to DTCP compatible devices in a home network 104 in the consumer's home 102. The home network can include a router 106 that receives IP content from the gateway and distributes the content over a WiFi or cable connection to client devices 111-113. The router 106, although shown separately, can be part of the gateway 100.

The home network 104 can further offer an IP connection that extends outside the home using wireless or cable connections that extend to the cloud 114. The content from the cloud 114 can then be accessed by an HLS device 116 through a 3G or 4G network 118. Using methods of embodiments of the present invention, the DTCP content provided from the gateway 100 is converted to an HLS compatible format and transmitted as HLS so that the HLS player device 116 will be compatible to receive the content from the gateway 100.

HLS Adaptor Overview

Embodiments of the present invention operate based on a determination of what makes DTCP not HLS compatible, and provide a DTCP encapsulation scheme that keeps the maximum amount of DTCP as possible while adapting portions that are needed for HLS compatibility. HLS will be the output provided from the system to satisfy the Apple standard, but the new DTCP encapsulation scheme will be used to alter DTCP compatible content to effectively form the "HLS adapter."

As a first requirement for HLS, the content must be HLS chunks. However, copy control and key definition can still come from DTCP. Looking at the Protected Content Packet (PCP) structure for DTCP, the content provided in the PCP payload can be broken into HLS chunks in real time. Besides the PCP payload, for HLS compatibility the standard PCP header information can be taken and made available to the HLS client device in the HLS key tag field, referred to herein as a new query field ?pcph=value. By providing the HLS key tag field, an advantage is that real DTCP keys can be used, exactly as DTCP would normally have. The encryption process can then be accomplished in a similar manner for HLS and DTCP, as the content encryption process for these standards differ only in the padding used.

PCP Structure

Figure 2:
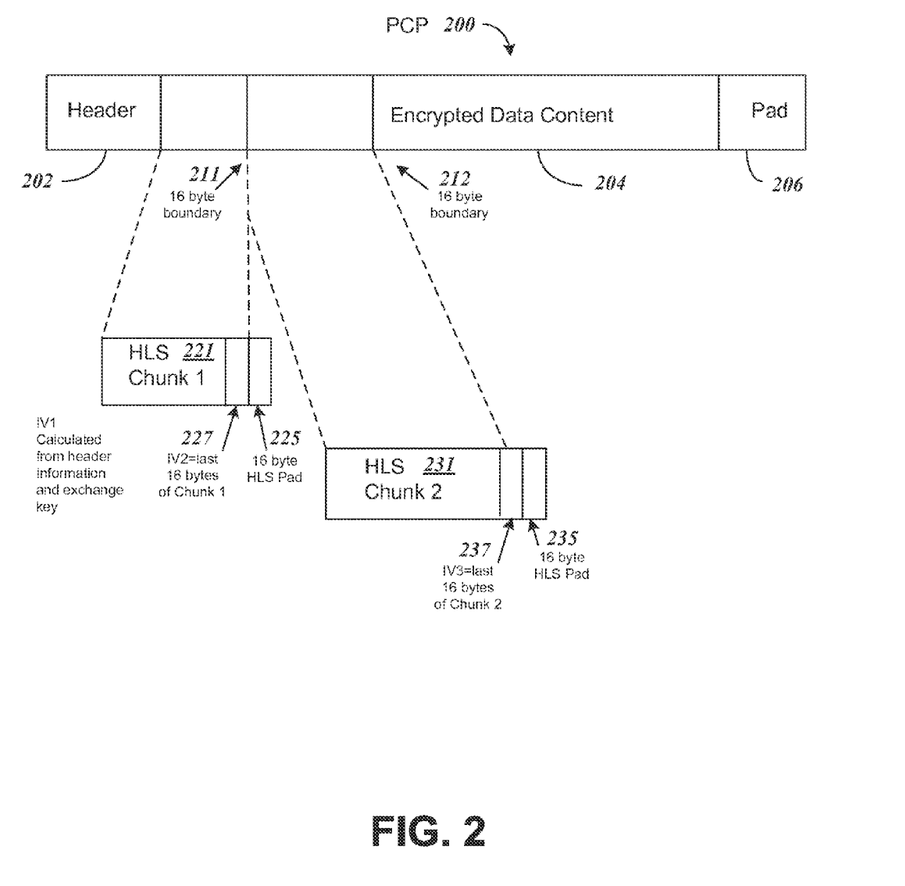
FIG. 2 illustrates the structure of a PCP for DTCP that is repackaged to enable use with HLS.

FIG. 2 illustrates the structure of a PCP for DTCP that is repackaged to enable use with HLS. In FIG. 2 the typical DTCP PCP 200 components are shown, including a header 202, encrypted data payload content 204 and padding 206. A typical DTCP PCP 200 structure encapsulates minutes of MPEG-2 transport format content 204 that is encrypted with AES-128 CBC, and includes the header 202 and padding 206. Standard HLS chunks are usually only seconds of content, rather than minutes, encrypted with the same AES-128 CBC, but with slightly different padding. The HLS adaptation of the DTCP according to embodiments of the present invention can, thus, be viewed as a repackaging of an encrypted DTCP PCP structure, encrypted under the identical key. The vast majority of the encrypted payload will be identical.

FIG. 2 further illustrates how the structure of a PCP for DTCP can be repackaged to enable use with HLS. In FIG. 2, each HLS chunk, such as 221 and 231, is formed from the PCP payload 204 and must have an Initialization Vector (IV), such as 227 and 237, and end with padding, such as 225 and 235, defined by Apple as PKCS7. The PCP payload 204 is divided at 16 byte boundaries, such as 211 and 212, so that the HLS padding needed, including 225 and 235, will also involve adding 16 bytes, and so that subsequent PCP encrypted content can be incorporated directly into chunks as shown. Both the chunks 221 and 231 with their 16 byte boundaries 211 and 212 and the 16 byte padding 225 and 235 will be encrypted with the DTCP content key, and appropriate IV. The first HLS chunk uses IV1 and is calculated using information from the PCP header 202 and DTCP parameters including an exchange key. The 16 byte padding 225 of the first HLS chunk 221 added at the end is encrypted using the last 16 bytes 227 of encrypted data of the first HLS chunk. Each subsequent chunk will be encrypted with content key and initial IV used will be the last 16 bytes of encrypted data of previous block (same as last 16 bytes of PCP encrypted data prior to start of that chunk). For example, for the second chunk, the IV comes from the last 16 bytes of the first chunk 221 and is 227. With this choice of IV, it is not necessary to decrypt and reencrypt the second chunk 231. The same method is followed for all the subsequent chunks until the last chunk. Only when we reach the very end of the PCP is the last chunk handled slightly differently when it is not a multiple of 16 bytes. For the last chunk, the very last 16 bytes of the PCP must be decrypted, the padding discarded, PKCS padding added, and then those 16 bytes reencrypted.

HLS Adapter System

Figure 3:
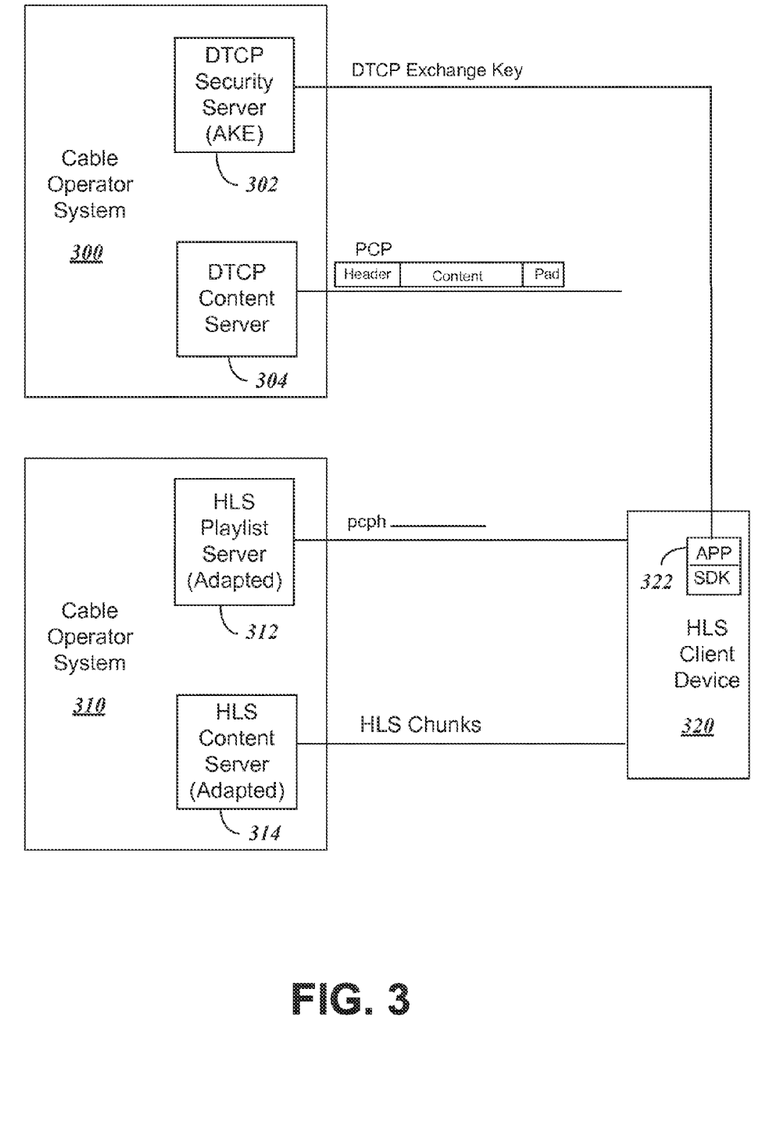
FIG. 3 shows components of a system that use an HLS Adapter System according to embodiments of the present invention to stream video.

FIG. 3 shows components of a system that use an HLS Adapter System according to embodiments of the present invention to stream video. The system includes an HLS Client Device, such as an iPad or other Apple device 320 along with Cable Operator Systems 300 and 310. The Cable Operator Systems 300 and 310 function to stream video data with a home gateway as shown in FIG. 1. Although two cable operator systems 300 and 310 are shown, a single cable operator can house the components shown.

The Cable Operator System 300 provides DTCP standard communications and includes a DTCP Security Server 302 and a DTCP Content Server 304. The security server 302 provides for the Authentication and Key Exchange (AKE) standard transaction in DTCP and can communicate with external devices to deliver DTCP Exchange Keys. The content server 304 delivers streaming data in PCP format with a header, content and pad as described with respect to FIG. 2.

The Cable Operator System 310 provides for HLS communications that uses a "HLS Adapter" under embodiments of the present invention to adapt DTCP content. The Cable System 310 includes an HLS Playlist Server 312 and an HLS Content Server 314. The HLS content is delivered in HLS chunks to the HLS client device player 320 from content server 314. The chunks are created as described above with respect to FIG. 2. The HLS Playlist server 312 delivers an HLS playlist that includes a new "pcph" query field to include an exchange key ID taken from the standard PCP header 202 of FIG. 2. Note that although the content server 314 and playlist server 312 are shown as two separate devices, the components for the servers 312 and 314 can be combined to a single server device. The HLS client device player 320 takes the exchange key ID, and uses an internal application program (APP) or software development kit (SDK) to communicate with the DTCP security server 302 to obtain the exchange key in a standard AKE transition for decryption of the HLS chunks using a content key calculated in a manner standard to DTCP.

The servers of the cable operator systems 300 and 302 and the client device 320 of FIG. 3 include at least one processor and at least one memory device to enable the processes of embodiments of the present invention. The memory devices will store software that when executed by the processor will cause the processor to perform the steps of the processes described.

PCP Header for Encryption

To provide for encryption and decryption, the PCP header information, including an exchange key ID, is obtained and appended to the usual HLS playlist keytag entry. The PCP header also provides copy control, nonce and CMI fields that are appended to the HLS playlist keytag entry to enable obtaining the exchange key. Of the 14 bytes of a typical DTCP PCP header, the last 4 length bytes are not needed, so the ?pcph query field used to append to the HLS playlist keytag entry would be only the first 10 bytes of the header, suitably base-64 encoded.

Proxy for Native Client HLS Player to Obtain Content Key

The content key can be provided to the client's native HLS player in several ways, which are client design choices. One way the content key can be provided is via a key proxy using 2-way SSL so that there is a secure binding to the native HLS player and its internal stored identity keys and certificate. For FIG. 3, the 2-way SSL connection can exist between the HLS player 320 and the security server 302 that can serve as a proxy server, such that the content key can be securely delivered to the HLS player 320.

A second way in which the content key can be provided to the native HLS player is via Apple's "custom URL" approach. In this case, the player directs its key request to the custom URL handler "proxy" that matches the protocol present in the key tag URL.

In normal use, the native HLS Apple player 320 would present the query string to the client key proxy, along with the key request, so that the DTCP subsection could use that header in its computation of the DTCP content key. In other words, the HLS player 320 looks at the keytag and hands over the URL and query field from the key tag to a client SDK proxy 322. The SDK proxy 322 then uses the information to obtain the DTCP exchange key from the server 302 and then calculates the DTCP content key in part based upon the exchange key and the query field. The SDK proxy 322 then provides the content key internally to the HLS player.

Playlist Structure

The HLS playlist used with embodiments of the present invention would be the real-time rolling style playlist, with 3 HLS chunks defined. Thus real-time streaming can be supported under HLS with continuous groups of 3 HLS chunks provided, just as DLNA and DTCP can be used for streaming with a flow of PCPs. For the HLS adaptation of the present invention, each content chunk in the playlist would have a corresponding keytag, as the IV changes for each chunk as described above. Though, while rolling through a many minutes long PCP, only one actual ?pcph query field would be in use, as the chunks all come from the same PCP. Only when the end of one playlist was reached, and a second started, would there be two different ?pcph query fields, and two different keys, present and in use for a brief time.

The client HLS player 320 of FIG. 3 will issue a HTTP GET command to the HLS playlist server 312 to get the playlist. The HTTP GET has the following example HTTP header structure:

```
GET /directoryname/Movie.m3u8
Host: 192.168.1.100:7878
Accept: */*
User-Agent: ArrisSDKProxy/0.1 (iPad; en_us)
```

An example HLS playlist obtained by the HTTP GET command is shown below. The playlist, Movie m3u8, has a structure assuming approximately 2 second duration chunks, and shows the first 3 chunks of the content. The HLS playlist example is as follows:

```
#EXTM3U
#EXT-X-TARGETDURATION: 2
#EXT-X-MEDIA-SEQUENCE:0
#EXT-X-KEY:METHOD=AES-
128,URI="https://iprm.tv/key?pcph=AkRCAAKVyRMZZg==",
IV=0xd7dd62914a57a1a0d3f12a05a6885b1a
#EXTINF:2,
Movie_0.ts
#EXT-X-KEY:METHOD=AES-
128,URI="https://iprm.tv/key?pcph=AkRCAAKVyRMZZg==",
IV=0x4f755cc6fe00c7f69df46a9603f60aab
#EXTINF:2,
Movie_1.ts
#EXT-X-KEY:METHOD=AES-
128,URI="https://iprm.tv/key?pcph=AkRCAAKVyRMZZg==",
IV=0x3c1f507b6806a33c1e1a544e1effle86
#EXTINF:2,
Movie_2.ts
```

For the example above, the playlist attributes are described as follows. First, three different urls are provided with label "128, URI=https:// . . . " one for each of the 3 chunks that contain the keytag ?pcph query strings. Note that this example is using an https proxy to accomplish delivery of the content key to the native client HLS player.

For the keytag ?pcph query strings of this example, the 10 byte PCP header is base 64 encoded and provided in the HLS keytag "?pcph" query string. Thus 10 bytes become 16 as shown. The PCP header fields in this example [bytes 0 and 1] are for copy free content with redistribution control, and exchange key label 0x44, and baseline AES cipher. As required by DTCP, the first nonce field [header bytes 2-9] of any connection starts with the "PCP-UR" field, header bytes 2 and 3, and ends with a 48 bit field $SN_C$ whose MSbit is a zero. The remaining 47 bits are random. Subsequent $SN_C$ fields (from subsequent PCP packets) within the same content flow can increment as required. In this example, the playlist identifies the first 3 two-second chunks of what would have been the first PCP packet of a connection flow. The 3 keytags show 3 different IVs but the same PCP header, and thus indicate the same content key.

As normal to HLS, a new playlist is presented roughly each 2 second interval, dropping the oldest chunk and adding the newest. Once the content flow moved beyond the chunks in the first original PCP packet, on to what would have been the second PCP packet (and second PCP header), the playlist would show the last two chunks of the first PCP, and the first chunk of the second. For this playlist, a new ?pcph query field would be introduced, indicating a second key was in use for that newest chunk. This new query field would roll through the playlist and eventually be the only one present, until the third PCP was reached, and so on.

Overview Flowchart

Figure 4:
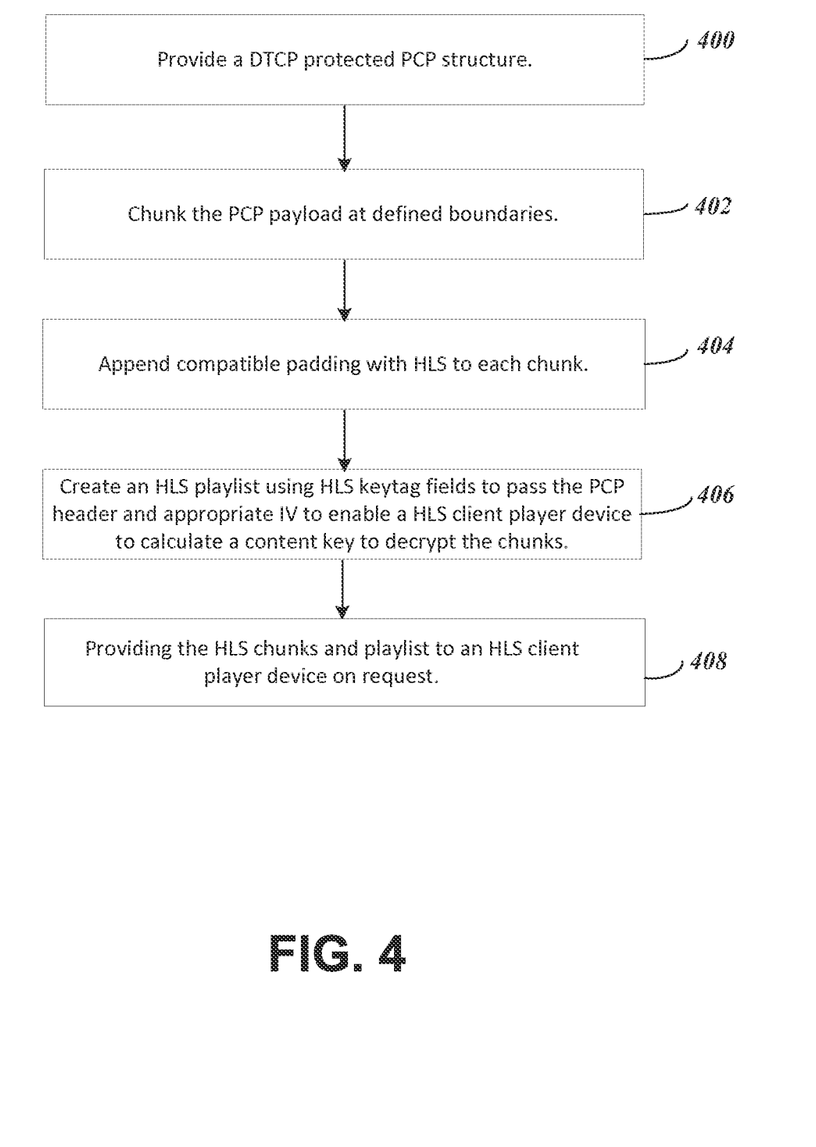
FIG. 4 provides a flowchart showing general operation to provide HLS adapted from DTCP according to embodiments of the present invention.

FIG. 4 provides a flowchart showing the general process of operation to provide HLS adapted from DTCP according to embodiments of the present invention. In FIG. 4, the process begins in step 400 by providing a DTCP protected PCP structure. In the next step 402, the PCP payload is chunked at defined boundaries to provide the chunks required by HLS. Compatible padding is then added to each chunk in step 404 that is compatible with HLS. In step 406 an HLS playlist is created using the PCP header to provide a keytag to enable an HLS client device to calculate a content key to decrypt the chunks. Finally, the HLS chunks and playlist are provided to the HLS client device on request.

PCP2 Support

PCP2 is a slightly different DTCP-IP packet format meant to allow the use of CMI descriptors in key derivation and rules processing. The ?pcph query field described above for the playlist needs no changes, as it already includes a packet type field that indicates whether the header format is PCP or PCP2. What is missing is the carriage of the CMI field. To account for the carriage of the CMI field, embodiments of the present invention add another query string field, called ?cmi=value. The ?cmi query field includes the equivalent of the "CMI field" of DTCP, which is a concatenation of all the CMI descriptors to be sent by the source. Again, in this case of the HLS keytag, this cmi query field must be base 64 encoded.

Thus in the example playlist, with CMI descriptor 0, 1 and 2 defined and carried, the DTCP CMI field would have 17 bytes, and a base 64 coded version would have 23 characters. An example of a change of the above playlist to include the CMI field is as follows:

---

EXT-X-KEY:METHOD=AES-128,URI="https://iprm.tv/key?pcph=
AkRCAAKVyRMZZg&cmi=AAAAABAABAA
DKVyRMZZghFm=",IV=0xd7dd62914a57a1a0d3f12a05a6885b1a

---

In this revised playlist, the actual bytes shown for the CMI field do not correspond to a specific cmi, but are present to show format and length.

Equivalent HLS Formation

In the embodiment described above, an original DTCP PCP structure is initially constructed, and then a new equivalent chunk and playlist structure is created that complies with HLS. As an alternative, a PCP is not actually constructed per se. Instead, the PCP header fields are determined, and the exchange key, and thus the content key and the first IV according to the DTCP specification. The chunks are constructed and encrypted directly, as if a PCP existed. The resulting content bytes are identical to the case where an actual PCP was constructed and converted.

Alternative Quasi-PCP Structure Format

In the embodiment described originally above, an original DTCP PCP structure is initially used, and a new equivalent chunk and playlist structure is created that complies with HLS, and contains the vast majority of the same content bytes as were in the original PCP. As an alternative, a PCP is not actually constructed per se. Instead, the PCP header is determined, and thus the content key and the first IV according to the DTCP spec. Then the content is divided up into chunks, and the first chunk is encrypted with the first IV. However, after the first chunk, the second chunk, third chunk, etc are encrypted with any IV that is convenient, rather than one derived from an actual equivalent PCP (encrypted packet). The IV match what would have been determined from the actual PCP. Thus the encrypted HLS content bytes would not match the byes of an equivalent PCP structure, although the content key was identical.

This alternative quasi-PCP structure is a bit simpler than the strict DTCP standard compliant PCP structure use in the system described above. The quasi-PCP structure allows some of the preprocessing for HLS chunking to be removed. Also, this quasi-PCP structure allows for removal of decryption and re-encryption preprocessing needed when creating HLS content from an existing PCP structure.

Trick Play Operations Using HLS Adapter

Normally for trick-play operations such as seek, rewind and fast forward, a large amount of video content needs to be available at one time to accomplish the procedure. With conventional HLS, only three chunks are typically available real time with 2 or 3 seconds of content per chunk. Thus, a trick-play operation to search the content of a video is not possible. For a gateway with DVR support, many minutes of content are available stored typically on a hard drive. As an update to the HLS adapter described above, and similar to the way in which DLNA and DTCP are used for trick modes, the rolling playlist style of HLS is used as described above, and the following adaptations are used to allow trick-play operations to be performed.

For a trick-play operation to search through completed recordings, it is important to provide a solution to the need for a SEEK anywhere in that recording, even though the rolling HLS playlist describes no such comprehensive list of chunks. According to embodiments of the present invention to accomplish a seek, the Digital Living Network Alliance (DLNA) standard seek operation structure is used, which is done in a DLNA header. If we are using an adapted HLS player with a SDK, such as 322 of FIG. 3, as part of the SDK the DLNA header can be added to the HLS GET command for the HLS playlist. To accomplish the DLNA seek, a small change must be supported in the HLS server so that it recognizes DLNA headers in an otherwise normal HLS GET.

On a SEEK request from the an HLS client device such as 320 of FIG. 3, the SDK such as 322 sends the HLS playlist request with the addition of the DLNA seek header (DLNA RANGE REQUEST). Upon receipt of the request, the HLS Server such as 312, after recognizing the DLNA SEEK header, would identify and generate the new playlist and chunks corresponding to the SEEK limits. The SDK would likely already know the extent of any completely recorded asset, as part of DLNA or proprietary metadata fields for the content.

The native HLS player however lacks the ability to know anything about the SEEK operation, or seek point, as it will be processing only live rolling style playlists. This SEEK to time position X can occur anywhere between zero and the asset duration. This resulting seek will be supported as a channel change for the HLS player, as the HLS playlist will completely change to identify chunks after the new start time position X after the HLS GET command is processed at the server side, such as by HLS playlist server 312 of FIG. 3. When the application requests a SEEK operation be performed by the server, custom SDK code must issue its own playlist or content GET so as to convey the SEEK position. If a custom (ie, not native or built-in) HLS player is used with this application/SDK, then the DLNA header is added to an actual playlist or HLS GET content. After receiving the HLS GET command, the server side will generate the updated playlist to reflect the seek position and the HLS player will automatically start playback from this position.

For seek operations with live services, a rolling style HLS playlist must still be provided. Since live services are normally associated with a PAUSE buffer, also called a "live off disk" buffer, a way is needed to convey the available beginning and end of that buffer. DLNA has a method defined wherein a DLNA header can include an available range request. This is a slight extension to the above SEEK note above, and returns the available SEEK range in another DLNA header field.

Figure 5:
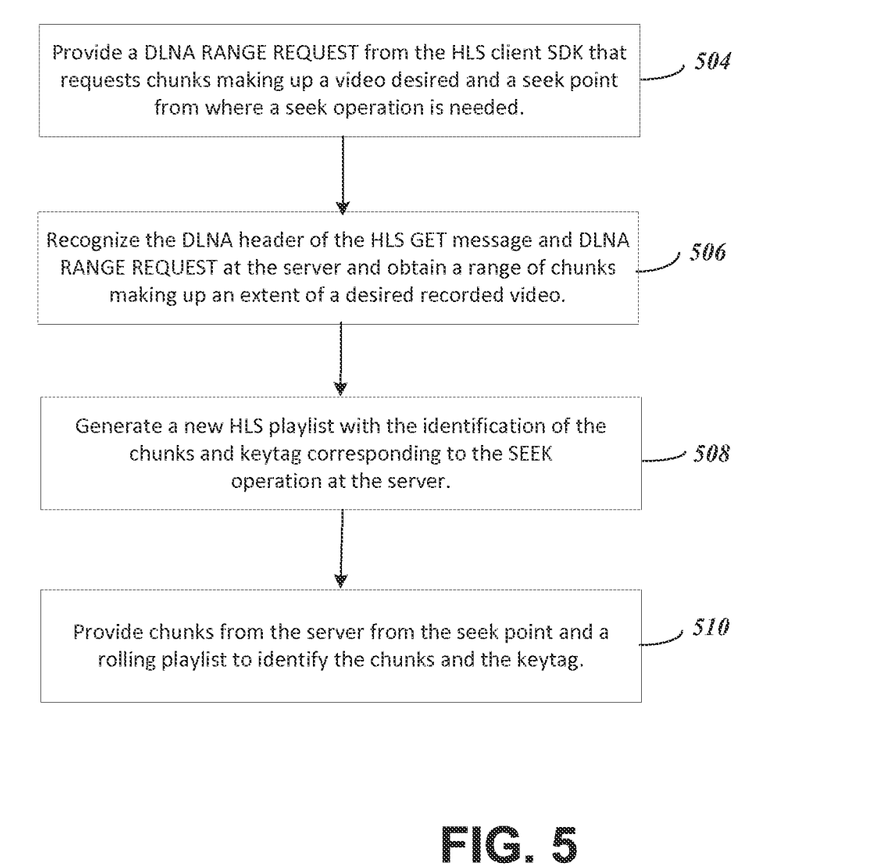
FIG. 5 provides a flowchart showing general operation to provide a trick play seek operation for HLS video that is adapted from DTCP.

FIG. 5 provides a flowchart showing general operation to provide a trick play seek operation for HLS video that is adapted from DTCP. In FIG. 5, the process begins in step 504 by the HLS client SDK providing a playlist request with a DLNA RANGE REQUEST header designating a desired seek point. In step 506, the server recognizes the DLNA header of the HLS GET message and DLNA RANGE REQUEST and obtains a range of chunks making up an extent of a desired recorded video. In step 508, the server generates a new HLS playlist with the identification of the chunks and keytag corresponding to the SEEK operation. Finally, in step 510, the server provides chunks from the seek point and a rolling playlist to identify chunks and the keytag.

Although the invention has been described in conjunction with specific embodiments, many alternatives, modifications and variations will be apparent to those skilled in the art. Accordingly, the invention described is intended to embrace all such alternatives, modifications and variations that fall within the spirit and broad scope of the appended claims.

The invention claimed is:

1. A method for producing HLS comprising:
producing HLS content producing a HLS playlist including identification of chunks and a keytag;
encrypting content with a DTCP key, calculated by the DTCP standard using: (a) copy control bits; (b) a nonce, and (c) an exchange key ID;
providing relevant PCP header fields in the keytag for the HLS playlist, including the value of the copy control, nonce and an ID for the exchange key, supporting the transaction that determines the exchange key; and
sending the PCP header fields by a query field appended to a URL of the keytag.

2. The method of claim 1, wherein an IV provided in the keytag is randomly generated.

3. The method of claim 1, wherein the query field comprises the same first 10 bytes as an actual PCP header, and is encoded in base 64.

4. The method of claim 1, wherein an IV provided in the keytag is calculated in the same manner as an IV calculated for a PCP header of the DTCP standard.

5. The method of claim 1, further comprising dividing content into chunks on 16 byte boundaries, so that an HLS padding field is 16 bytes long.

6. The method of claim 5, further comprising choosing IVs for each chunk such that encrypted data in the chunks, with the HLS padding removed, with all chunks appended together is the same as an equivalent PCP would have carried.

7. The method of claim 6, wherein second and subsequent chunk padding IVs are set for the HLS playlist by copying the last 16 bytes of content from a previous chunk prior to its padding.

8. The method of claim 1, wherein the exchange key ID and keytag can be delivered in response to a client request, and used by the client to obtain a DTCP content key to enable the HLS content to be decrypted.

9. The method of claim 1, wherein the keytag includes an IV calculated using DTCP.

10. The method of claim 7, wherein a DTCP standard PCP structure is encrypted using the first IV.

11. The method of claim 1, wherein the exchange key is acquired during an AKE transaction using the exchange key ID.

12. The method of claim 1, wherein when an iOS client player provides information from the PCP header with a key request, the DTCP content key is calculated in part based upon the related AKE transaction standard to DTCP.

13. The method of claim 1, wherein the DTCP content key is calculated and delivered to the client native HLS player using a proxy.

14. The method of claim 13, further comprising providing query field information of the keytag (pcph=value) from the equivalent PCP header to a client SDK when the client native player requests the content key, wherein when the client that comprises an iOS HLS player presents the query field PCP header (pcph) to the local host client proxy, the DTCP key is provided to the client from the proxy.

15. The method of claim 1, wherein the DTCP content key is calculated and delivered to the client native HLS player using an iOS custom URL handler.

16. The method of claim 3, wherein the playlist is a rolling HLS playlist provided by a server, wherein while the rolling playlist rolls through and within a single PCP only one query field is used.

17. The method of claim 16, wherein when the rolling playlist includes chunks from the end of one PCP and the start of the next two different ?pcph fields, and wherein two different exchange keys will be in use for a brief time.

18. A method for producing HLS comprising:
producing HLS content producing a HLS playlist including identification of chunks and a keytag;
encrypting content with a DTCP key, calculated by the DTCP standard using: (a) copy control bits; (b) a nonce, and (c) an exchange key ID; and
providing relevant PCP header fields in the keytag for the HLS playlist, including the value of the copy control, nonce and an ID for the exchange key, supporting the transaction that determines the exchange key,
wherein the keytag URL is appended with a CMI query field portion to enable compatibility with the CMI field for PCP2 of DTCP.

19. The method of claim 18, wherein the CMI query field portion is a concatenation of all CMI descriptors of the CMI field for PCP2.

20. The method of claim 19, wherein the CMI query field portion is base 64 encoded.

* * * * *